Patented Aug. 11, 1953

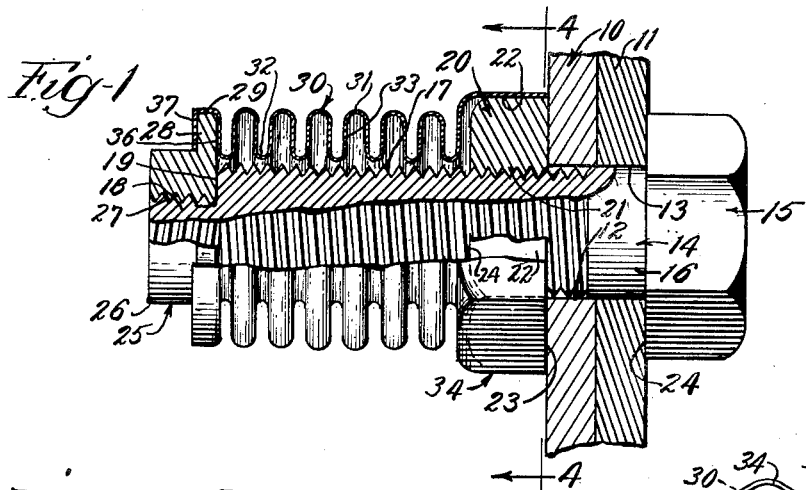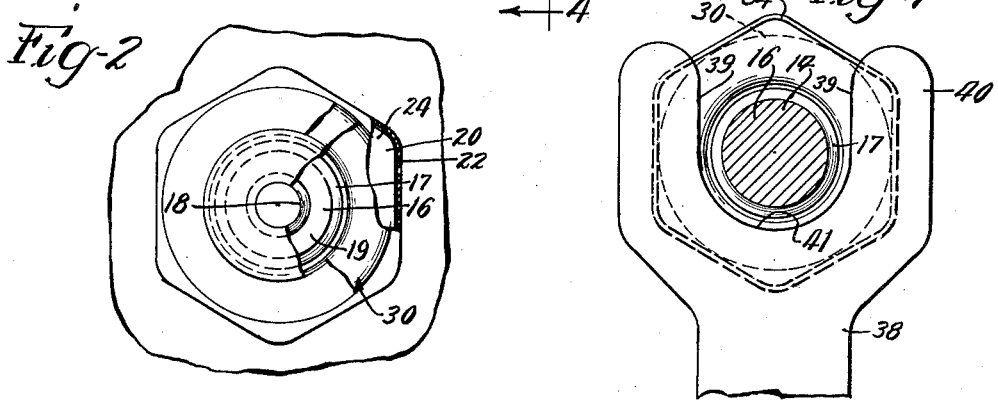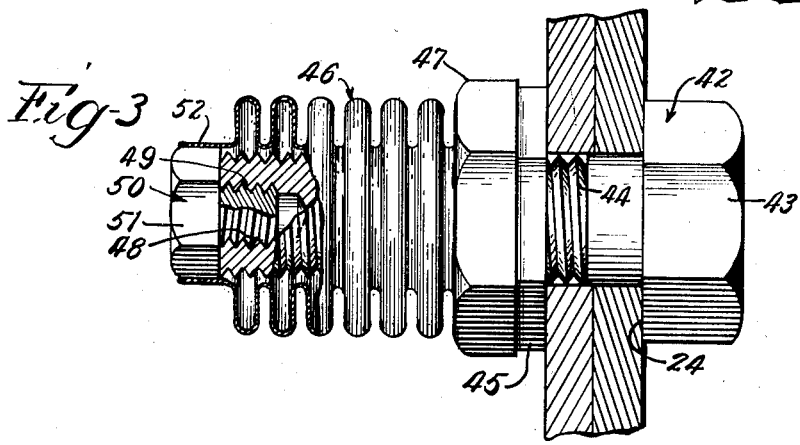

2,648,367

UNITED STATES PATENT OFFICE 2,648,367

LOCK NUT

Russell E. Curran, Chicago, Ill.

Application October 17, 1951, Serial No. 251,794

10 Claims. (Cl. 151—18)

The present invention relates to lock nuts, and is particularly concerned with the provision of improved devices for locking threaded members in place, whether they be nuts or threaded bolts.

One of the objects of the invention is the provision of an improved lock nut which positively locks the nut in its adjusted position, but in which the threads are protected against corrosion or deterioration in such manner that the nut will never become corroded in place and can always be released and replaced with a minimum amount of labor.

Another object of the invention is the provision of an improved locking arrangement for nuts and other threaded members, which utilizes the principle of left hand and right hand threads so that any tendency toward loosening of the nut is resisted by a member which is threaded in the opposite direction, and which is tightened by such a loosening tendency.

Another object of the invention is the provision of an improved locking arrangement for nuts and bolts, which is sturdy, simple, which has a minimum number of parts, which is capable of economical manufacture, which involves a minimum number of machine operations, and which may be used repeatedly without damage to the threads or any other parts of the assembly.

Other objects and advantages of the invention will be apparent from the following description and the accompanying drawings, in which similar characters of reference indicate similar parts throughout the several views.

Referring to the single sheet of drawings accompanying this specification,

Fig. 1 is a side elevational view in partial section of a lock nut assembly embodying my invention;

Fig. 2 is a fragmentary end elevational view;

Fig. 3 is a view similar to Fig. 1 of a modification;

Fig. 4 is a transverse sectional view taken on the plane of the line 4—4 of Fig. 1, with the parts in a collapsed position, with the bellows socketed member 34 withdrawn from the nut.

Referring to Figs. 1 and 2, 10 and 11 indicate two metal members, which may also be made of other materials, provided with registering bores 12 and 13 for receiving the bolt 14 used to secure these metal members together. The bolt 14 preferably has a non-circular head 15, which may be square, hexagonal, or any shape desired.

The bolt has a shank 16, which is provided with standard threads 17 and a reduced threaded portion 18, which is provided with threads running in the opposite direction; that is, if the threads 17 are right hand threads, which they preferably are, then the threads 18 are left hand, or vice versa.

Between the reduced threaded portion 18 and the larger threaded portion 17 there is an annular shoulder 19.

The nut 20 may be of any standard shape and is provided with a threaded bore 21 complementary to the threads 17. The external surface 22 of the nut 20 is preferably hexagonal, but may also be square; and the nut preferably has a plane end thrust surface 23 for engaging the metal plate 10. Likewise the inner surface 24 of the head is preferably plane.

The assembly also includes a second nut 25, having an external hexagonal surface 26, which in some cases may be square. The nut 26 has a threaded bore 27 provided with left hand threads complementary to the left hand threads 18.

The nut 25 is also provided with a radially extending flange 28 preferably provided with a noncircular periphery 29, which may be hexagonal, for example. The flange 28 of the nut 25 supports a flexible metallic bellows 30, which has a plurality of annular curved portions 31, which are outwardly convex, and which are joined to the outwardly concave portions 32 by annular radial portions 33.

The bellows 30 has both of its ends provided with a special shape, as follows: The right end 34 of the bellows is provided with a hexagonal cup shape, which is complementary to the external hexagonal surface 22 of the nut 20. The opposite end 35 of the bellows preferably has a narrower portion provided with a substantially circular cup 36 adapted to receive the flange 28; and it is also provided with an inwardly turned retaining flange 37, which may be spun over to clamp the bellows portion 35 on the flange 28 and to secure it against relative rotation between the nut 25 and the bellows 30.

The central portion, which includes the portions 31, 32, 33 of the bellows, is, of course, capable of being compressed axially or extended axially; but it has an initial expanding tension, which tends to keep it in engagement with the nut 20, as shown in Fig. 1.

The hexagonal cup 34, can, however, be withdrawn from the nut 20 by moving it in an axial direction toward the left. The amount of collapsing movement of the bellows 30 must be sufficient to permit the hexagonal cup 34 to be withdrawn from the nut 20.

For ease in handling the assembly a tool 38 is preferably provided, which has an open slot 39 in its head 40, the slot having a circular base 41 of sufficient size to receive the shank 16. The size of the head 40 is preferably sufficient to project outside the hexagonal cup 34 so that the bellows 30 may be collapsed and the tool 38 inserted between its end and the nut 20.

The bolt 14 is first arranged in the bores 12 and 13 of the members 10 and 11, which it is intended to secure together; and the nut 20 is threaded home on the threaded portion 17.

The operation of this lock nut is as follows: The bellows 30 and its hexagonal cup 34 are placed over the threaded portion 17 of the bolt 14; and the tool 38 may be placed about the shank 17 between the nut 20 and the end of the hexagonal cup 34. The nut 25 may then be pushed axially toward the reduced threaded portion 17; and as the tool 38 is holding the hexagonal cup 34 off the nut 20, the nut 25 may then be threaded in a left hand direction, while the bellows 30 rotates with it, sliding on the tool 38.

The nut 25 is threaded in a left hand direction until it engages the shoulder 19, against which it is tightly wedged. Thereafter the tool 38 may be removed; and assuming that the hexagonal cup 34 now registers with the hexagonal surface 22 on the outside of the nut 20, the tool 38 may be removed; and the expansion of the bellows will move the hexagonal cup 34 over the nut 20.

If these parts do not register, then the nut 25 is backed off in a left hand direction until they do register. It is not necessary for the nut 25 to be wedged against the surface 19. By virtue of the right hand thread 17 and the left hand thread 18 opposing it, the nut 25 and bellows 30 hold the nut 20 in its tightened position.

Whenever it is desired to loosen the nut 20, it is only necessary to retract the bellows 30 until the hexagonal cup 34 moves off the nut 20; and then the nut 20 can be loosened or tightened; or the nut 25 can be moved off entirely in a left hand direction, carrying with it the bellows 30.

The bellows, by virtue of its own resiliency, tends to expand into engagement with the nut 20 and to hold it in any adjusted position desired. The present lock nut may be used where it is desired to have a clearance between the nut and the head and the members 10 and 11 secured thereby.

Any tendency for the nut 20 to turn in either direction is resisted by the nut 25, which is threaded in the opposite direction, and which may be tightly threaded against a shoulder 19 to resist turning of the nut 20 in either direction.

Referring now to Fig. 3, this is a modification, in which a bolt 42 is provided with a head 43 and a threaded shank 44. 45 indicates the complementary nut which is to be locked in place. 46 indicates the bellows with its hexagonal cup 47 slidably engaging the nut 45 in an axial direction, but preventing any rotation.

In this case the end of bolt 42 has a threaded bore 48; and if the threads 44 are right hand, then the threads 48 are left hand. The threaded bore 48 receives the complementary threaded shank 49 of a locking bolt 50, which has a hexagonal head 51.

The bellows in this case has a hexagonal tubular portion 52, which fits on the nut 50 and prevents relative rotation between the bellows and the nut 50. The hexagonal portion 52 is preferably brazed, soldered, or welded to the sides of the nut 50 so that the bellows 46 and nut 50 rotate as a unit.

The present modification works exactly the same as the preceding one, except that the threaded member 50 is threaded into a bore, instead of being a nut.

It will thus be observed that I have invented a plurality of modifications of lock nut assembly, in which the nut is locked without any damage to the nut or locking member so that it may be unlocked and removed at any time and again re-assembled as often as necessary.

The bellows also covers and protects the exposed threads of the bolt so that they do not become corroded; and the entire threaded portion of the bolt and nut are protected against the weather.

The present locking arrangement is simple, it includes a minimum number of parts; and it may be manufactured at a low cost.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a lock nut assembly, the combination of a bolt having a threaded shank and a head, the said bolt having a threaded extension of reduced size on said shank and threaded in the opposite direction, a member to be secured by the bolt, and a main nut having threads complementary to the threads on the shank, confining the said member between the head and said nut, a second nut having threads complementary to the reduced extension, said second nut supporting a resilient member having a socket for engaging the non-circular sides of the first-mentioned nut, the socket being capable of being withdrawn by collapsing said resilient member, the said resilient member comprising a bellows fixedly secured upon the second nut, and said bellows having its parts spaced to allow the bellows to be compressed to disengage the bellows end from the main nut to permit relative rotation of the main nut on its bolt.

2. In a lock nut assembly, the combination of a bolt having a threaded shank and a head, the said bolt having a threaded extension of reduced size on said shank and threaded in the opposite direction, a member to be secured by the bolt, and a main nut having threads complementary to the threads on the shank, confining the said member between the head and said nut, a second nut having threads complementary to the reduced extension, said second nut supporting a resilient member having a socket for engaging the non-circular sides of the first-mentioned nut, the socket being capable of being withdrawn by collapsing said resilient member, the said resilient member comprising a bellows fixedly secured upon the second nut, by having a noncircular socket receiving said second nut, and being bent over a part on said second nut to retain the bellows permanently on the second nut, and said bellows having its parts spaced to allow the bellows to be compressed to disengage the bellows end from the main nut to permit relative rotation of the main nut on its bolt.

3. In a lock nut assembly, the combination of a bolt having a head and a threaded shank and a main nut complementary to said threaded shank, said bolt having a threaded bore threaded in the opposite direction, and a headed bolt threaded into said latter bore, a resilient member fixedly carried by said headed bolt, and having means for engaging the flat sides of the first-mentioned nut to hold it against turning, said resilient member comprising a metal bellows, and said bellows having its parts spaced to allow the bellows to be compressed to disengage the bellows end from the main nut to permit relative rotation of the main nut on its bolt.

4. In a lock nut assembly, the combination of a bolt having a head and a threaded shank and a main nut complementary to said threaded shank, said bolt having a threaded bore threaded in the opposite direction, and a headed bolt threaded into said latter bore, a resilient member carried by said headed bolt, and having means for engaging the flat sides of the first-mentioned nut to hold it against turning, said resilient member comprising a metal bellows, said metal bellows having sockets at each of its ends for receiving both nuts and preventing relative rotation between them, and said bellows having its parts spaced to allow the bellows to be compressed to disengage the bellows end from the main nut to permit relative rotation of the main nut on its bolt.

5. In a lock nut assembly, the combination of a bolt having a head and a threaded shank and a nut complementary to said threaded shank, said bolt having a threaded bore threaded in the opposite direction, and a headed bolt threaded into said latter bore, a resilient member carried by said headed bolt, and having means for engaging the flat sides of the first-mentioned nut to hold it against turning, said resilient member comprising a metal bellows, said metal bellows having sockets at each of its ends for receiving both nuts and preventing relative rotation between them, said bellows being fixedly secured with its socket on one of said nuts, and said bellows having its parts spaced to allow the bellows to be compressed to disengage the bellows end from the main nut and to permit relative rotation between the bellows and the main nut.

6. A lock nut assembly comprising a threaded bolt provided with a head and with a threaded shank, a nut on said shank, said nut having a bore which is complementarily threaded with respect to said shank, said nut having a noncircular outer surface, said shank being provided with an end portion threaded in the opposite direction to the threading on the shank, a threaded member threadedly engaged with said oppositely threaded end portion, and a bellows secured to said latter threaded member, and having a plurality of peripheral folds and extending longitudinally of the threaded shank of said bolt and covering the threaded shank between said threaded member and said nut, said bellows being provided with a noncircular socket engaging the outer noncircular surface of said nut and said bellows folds being spaced sufficiently to cause said socket to clear said nut and to be removable from said nut by compressing said bellows axially, said bellows holding said nut in fixed position by virtue of the bellows being fixedly mounted upon said oppositely threaded member.

7. In a lock nut assembly of the type for locking a main threaded nut on a threaded shank having threads complementary to the main nut, the improvement which comprises a second non-circular end member fixedly mounted on the end of said shank, and a resilient bellows having a non-circular socket at one end for removably engaging the external non-circular surface of said main nut to prevent relative rotation between the bellows and main nut, said bellows having its parts spaced sufficiently to permit the bellows to be collapsed sufficiently to disengage the forward non-circular socket from the main nut and said bellows being provided with a second non-circular socket at its other end for engaging about the non-circular surface of said end member to prevent relative rotation between the bellows and the end member.

8. In a lock nut assembly of the type for locking a main threaded nut on a threaded shank having threads complementary to the main nut, the improvement which comprises a second non-circular end member fixedly mounted on the end of said shank, and a resilient bellows having a non-circular socket at one end for removably engaging the external non-circular surface of said main nut to prevent relative rotation between the bellows and main nut, said bellows having its parts spaced sufficiently to permit the bellows to be collapsed sufficiently to disengage the forward non-circular socket from the main nut and said bellows being provided with a second non-circular socket at its other end for engaging about the non-circular surface of said end member to prevent relative rotation between the bellows and the end member, said shank also having threads extending in the opposite sense and said second non-circular end member having complementary threads in the opposite sense for fixedly securing said end member on said shank.

9. In a lock nut assembly of the type for locking a main threaded nut on a threaded shank having threads complementary to the main nut, the improvement which comprises a second non-circular end member fixedly mounted on the end of said shank, and a resilient bellows having a non-circular socket at one end for removably engaging the external non-circular surface of said main nut to prevent relative rotation between the bellows and main nut, said bellows having its parts spaced sufficiently to permit the bellows to be collapsed sufficiently to disengage the forward non-circular socket from the main nut and said bellows being provided with a second non-circular socket at its other end for engaging about the non-circular surface of said end member to prevent relative rotation between the bellows and the end member, said shank also having threads extending in the opposite sense and said second non-circular end member having complementary threads in the opposite sense for fixedly securing said end member on said shank, said threads of opposite sense being mounted on a reduced portion of said shank and said end member comprising a second nut engaging in the socket in the adjacent end of said bellows.

10. In a lock nut assembly of the type for locking a main threaded nut on a threaded shank having threads complementary to the main nut, the improvement which comprises a second non-circular end member fixedly mounted on the end of said shank, and a resilient bellows having a non-circular socket at one end for removably engaging the external non-circular surface of said main nut to prevent relative rotation between the bellows and main nut, said bellows having its parts spaced sufficiently to permit the bellows to be collapsed sufficiently to disengage the forward non-circular socket from the main nut and said bellows being provided with a second non-circular socket at its other end for engaging about the non-circular surface of said end member to prevent relative rotation between the bellows and the end member, said shank also having threads extending in the opposite sense and said second non-circular end member having complementary threads in the opposite sense for fixedly securing said end member on said shank, said shank having an end bore containing said opposite threads, and said second member comprising a headed bolt having a shank with opposite complementary threads engaged in said bore.

RUSSELL E. CURRAN.

References Cited in the file of this patent

UNITED STATES PATENTS

| Number | Name | Date |
|---|---|---|
| 1,143,247 | Bates | June 15, 1915 |
| 1,331,011 | Greer | Feb. 17, 1920 |
| 1,384,859 | Sartain | July 19, 1921 |
| 2,264,282 | Ambrose | Dec. 2, 1941 |

FOREIGN PATENTS

| Number | Country | Date |
|---|---|---|
| 31,485 | Austria | Jan. 25, 1908 |